(12) United States Patent
Dan

(10) Patent No.: US 10,367,543 B2
(45) Date of Patent: *Jul. 30, 2019

(54) CALIBRATION FOR SPREAD SPECTRUM CLOCK GENERATOR AND METHOD THEREFOR

(71) Applicant: SEMICONDUCTOR COMPONENTS INDUSTRIES, LLC, Phoenix, AZ (US)

(72) Inventor: Toru Dan, Gifu (JP)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 280 days.

This patent is subject to a terminal disclaimer.

(21) Appl. No.: 14/864,135

(22) Filed: Sep. 24, 2015

(65) Prior Publication Data

US 2017/0093459 A1 Mar. 30, 2017

(51) Int. Cl.
*H04B 1/7097* (2011.01)
*H04L 27/12* (2006.01)
*H04B 15/04* (2006.01)

(52) U.S. Cl.
CPC ........... *H04B 1/7097* (2013.01); *H04B 15/04* (2013.01); *H04L 27/12* (2013.01)

(58) Field of Classification Search
CPC ..... H03L 7/1974; H03L 7/093; H03L 7/1976; H03L 7/18; H04B 14/06; H04B 2215/067; H03C 3/0925; H03C 3/0933; G06F 1/02; G06F 1/03
See application file for complete search history.

(56) References Cited

U.S. PATENT DOCUMENTS

| 5,488,627 | A | 1/1996 | Hardin et al. |
| 6,008,703 | A | 12/1999 | Perrott |
| 6,249,876 | B1 | 6/2001 | Balakrishnan et al. |
| 6,442,188 | B1 * | 8/2002 | Zhang ............ H04B 15/04 327/156 |
| 2003/0039330 | A1 * | 2/2003 | Castiglione ......... H03L 7/197 375/376 |

(Continued)

OTHER PUBLICATIONS

D.B.Yen Nguyen, J.A.Cartwright, Young-Hun Ko, Sang-Gug Lee and D.S.Ha, "A high-precision spread spectrum clock generator based on a fractional-N phase locked loop", U-Radio Lab, Korean Advanced Institute of Science Technology and VTVT Lab, Virginia Tech, Analog Integrated Circuits and Signal Processing, Jan. 2013.*
See Taur Lee, Sher Jiun Fang, David J. Allstot, Abdellatif Bellaouar, Ahmed R. Fridi and Paul A. Fontaine, "A Quad-Band GSM-GPRS Transmitter With Digital Auto-Calibration", University of Washington and Texas Instruments, Dec. 2004, IEEE.*

(Continued)

*Primary Examiner* — Aristocratis Fotakis
(74) *Attorney, Agent, or Firm* — Polansky & Associates, P.L.L.C.; Paul J. Polansky

(57) ABSTRACT

In one form, a spread spectrum clock generator includes a clock generator and a modulator. The clock generator modulates a frequency of a reference clock signal using a modulation signal to provide a spread spectrum clock signal. The clock generator has a characteristic transfer function that varies with values of a parameter. The modulator generates the modulation signal according to a desired profile conditioned by an inverse of the characteristic transfer function of the clock generator at a current value of the parameter.

20 Claims, 12 Drawing Sheets

(56) References Cited

U.S. PATENT DOCUMENTS

| | | | | |
|---|---|---|---|---|
| 2004/0183602 A1* | 9/2004 | Maunuksela | ........ | H03C 3/0925 331/17 |
| 2005/0008113 A1* | 1/2005 | Kokubo | .................... | G06F 1/04 375/376 |
| 2005/0129142 A1* | 6/2005 | Yellin | .................. | H03C 3/0925 375/302 |
| 2005/0151595 A1* | 7/2005 | Pratt | ................... | H03C 3/0925 331/16 |
| 2006/0056561 A1* | 3/2006 | Zhang | .................... | H03L 7/087 375/376 |
| 2006/0088126 A1* | 4/2006 | Puma | .................... | H04L 27/12 375/302 |
| 2007/0176705 A1* | 8/2007 | Sutardja | .................. | H01L 23/34 331/176 |
| 2008/0042766 A1* | 2/2008 | Tarng | .................... | H03B 5/04 331/167 |
| 2008/0063130 A1* | 3/2008 | Chen | .................... | H04B 15/02 375/376 |
| 2011/0163815 A1* | 7/2011 | Bellaouar | ............ | H03C 3/0991 331/10 |
| 2012/0105114 A1 | 5/2012 | Yun | | |
| 2012/0112809 A1 | 5/2012 | Zhu | | |

OTHER PUBLICATIONS

M. Kokubo et al., "Spread-Spectrum Clock Generator for Serial ATA using Fractional PLL Controlled by ΔΣModulator with Level Shifter," 2005 IEEE International Solid-State Circuits Conference, Feb. 8, 2005, pp. 160-161 & p. 590.

T. Ebuchi et al., "A 125-1250 MHz Process-Independent Adaptive Bandwidth Spread Spectrum Clock Generator with Digital Controlled Self-Calibration," IEEE Journal of Solid-State Circuits, vol. 44, No. 3, Mar. 2009, pp. 763-774.

Power Electronics Technology, "Conforming with Worldwide Safety and EMC/EMI Standards," Nov. 2010, pp. 24-27.

C. Kim et al., "A Cost-Effective Design of Spread Spectrum Clock Generator," 2010 IEEE International Conference on Solid-State and Integrated Circuit Technology, Nov. 2010, 4 pages.

D. Stone et al., "Random Carrier Frequency Modulation of PWM Waveforms to Ease EMC Problems in Switched Mode Power Supplies," 1995 International Conference on Power Electronics and Drive Systems, Feb. 1995, pp. 16-21.

Actions on the Merits in copending U.S. Appl. No. 14/864,060.

* cited by examiner

US 10,367,543 B2

CALIBRATION FOR SPREAD SPECTRUM CLOCK GENERATOR AND METHOD THEREFOR

CROSS-REFERENCE TO RELATED APPLICATIONS

Related subject matter is found in a copending patent application entitled "SPREAD SPECTRUM CLOCK GENERATOR AND METHOD THEREFOR", U.S. patent application Ser. No. 14/864,060, filed Sep. 24, 2015, invented by Toru Dan and assigned to the assignee hereof.

FIELD OF THE DISCLOSURE

The present disclosure relates generally to clock generator circuits, and more particularly to spread spectrum clock generator circuits.

BACKGROUND

Some electronic components are susceptible to faulty operation in the presence of high levels of electromagnetic interference (EMI). EMI is any unwanted signal transmitted by electromagnetic induction or electromagnetic radiation that affects an electrical circuit. There are many potential sources of EMI such as digital clock signals in microprocessors and microcontrollers, periodic signals used in switched mode power supplies, local oscillator signals used in radio circuits to tune radio frequency (RF) signals, periodic noise from induction motors, and the like.

Several different standards bodies in different jurisdictions around the world define acceptable levels of generated EMI for a certified product. In order to reduce EMI below these standardized levels, circuit designers have sometimes used spread spectrum clock signals. Instead of having a constant frequency, spread spectrum clock signals have frequencies that vary over a certain range to reduce the radiated energy at any given frequency to below the standardized level. In order to efficiently implement spread spectrum, it is desirable to spread the energy of the clock signal as uniformly as possible over the desired range. One known technique to spread the spectrum over the desired range is to vary the frequency of the clock signal using a lower frequency triangular wave signal. While spreading the clock frequency using a triangular wave signal theoretically yields a perfectly uniform frequency spectrum, it becomes less than perfect when using real circuits such as phase locked loops (PLLs), limiting the effectiveness of the spread spectrum clock generator.

BRIEF DESCRIPTION OF THE DRAWINGS

The present disclosure may be better understood, and its numerous features and advantages made apparent to those skilled in the art by referencing the accompanying drawings, in which.

The use of the same reference symbols in different drawings indicates similar or identical items. Unless otherwise noted, the word "coupled" and its associated verb forms include both direct connection and indirect electrical connection by means known in the art, and unless otherwise noted any description of direct connection implies alternate embodiments using suitable forms of indirect electrical connection as well.

DETAILED DESCRIPTION

Figure 1:
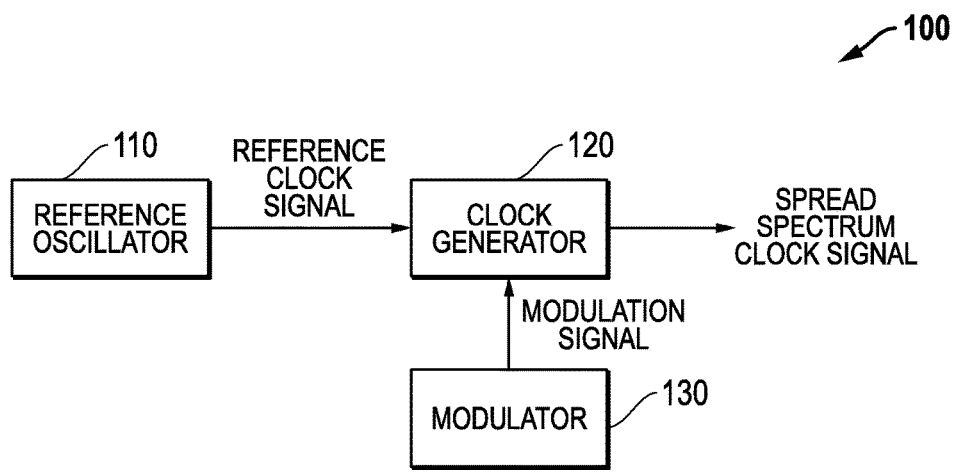
FIG. 1 illustrates in block diagram form a spread spectrum clock generator known in the prior art.

FIG. 1 illustrates in block diagram form a spread spectrum clock generator 100 known in the prior art. Spread spectrum clock generator 100 includes a reference oscillator 110, a clock generator 120, and a modulator 130. Reference oscillator 110 has an output for providing a clock signal labeled "REFERENCE CLOCK SIGNAL" at a desired nominal frequency. Note that if the REFERENCE CLOCK SIGNAL is a square wave clock signal, it will have energy at the fundamental frequency and odd harmonics thereof. Clock generator 120 has a first input connected to the output of reference oscillator 110, a second input for receiving a signal labeled "MODULATION SIGNAL", and an output for providing signal labeled "SPREAD SPECTRUM CLOCK SIGNAL". Modulator 130 has an output connected to the second input of clock generator 120 for providing the MODULATION SIGNAL thereto.

Spread spectrum clock generator 100 varies the frequency of the clock signal output by reference oscillator 110 over a desired range according to the MODULATION SIGNAL, and in that way reduces the radiated energy of the spread spectrum clock signal at any particular frequency so that the product associated with spread spectrum clock generator 100 can meet applicable EMI standards. Spread spectrum clock generator 100 can be used in a variety of electronic products and reference oscillator 110 provides a clock signal whose characteristics vary according to the application. For example, reference oscillator 110 can provide a digital square wave REFERENCE CLOCK SIGNAL having energy at the primary frequency and at harmonics of the primary frequency, and clock generator 120 can be implemented with a phase locked loop (PLL).

Modulator 130 typically provides the MODULATION SIGNAL to vary the frequency of the REFERENCE CLOCK SIGNAL over a few percent of the nominal frequency of the REFERENCE CLOCK SIGNAL. The frequency of the MODULATION SIGNAL must be high enough to spread the energy spectrum over a wide band of frequencies, but not so high as to cause clock jitter.

Figure 2:
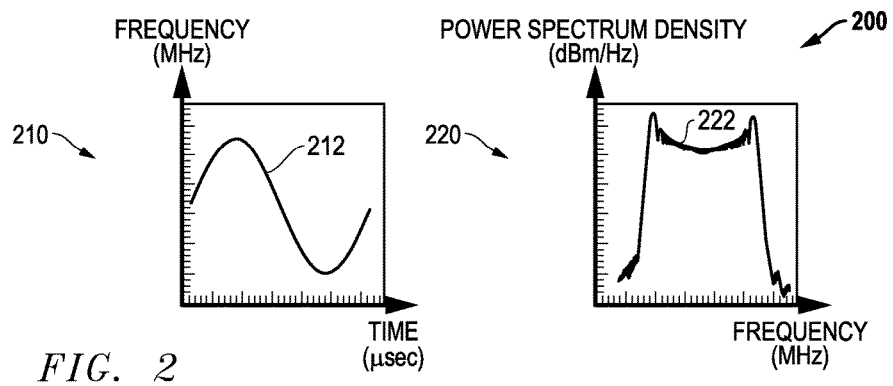
FIG. 2 illustrates a dual timing diagram and frequency graph of the spread spectrum clock generator of FIG. 1 when using a first type of modulation signal.

FIG. 2 illustrates a dual timing diagram and frequency graph 200 of the spread spectrum clock generator 100 of FIG. 1 when using a first type of modulation signal. Shown in FIG. 2 are a timing diagram 210 and a frequency graph 220. In timing diagram 210 the horizontal axis represents time in microseconds (μsec), and the vertical axis represents frequency in megahertz (MHz). A waveform 212 shows the MODULATION SIGNAL having a sinusoidal waveform. Note that the sinusoidal waveform exhibits periods near the high and low voltages at which the rate of change is lower than it is around the midpoint.

In frequency graph 220, the horizontal axis represents frequency in megahertz (MHz), and the vertical axis represents the power spectrum density in decibels referenced to one milliwatt (dBm/Hz). A waveform 222 shows the power spectrum density of the SPREAD SPECTRUM CLOCK SIGNAL versus frequency. As shown in FIG. 2, the power spectrum density exhibits peaks around the low and high frequencies of the band, and the peaking is significantly above the level in the center of the band. Since the EMI is measured based on the highest power, frequency graph 220 shows that the peaking limits the effectiveness of sinusoidal modulation in reducing EMI.

Figure 3:
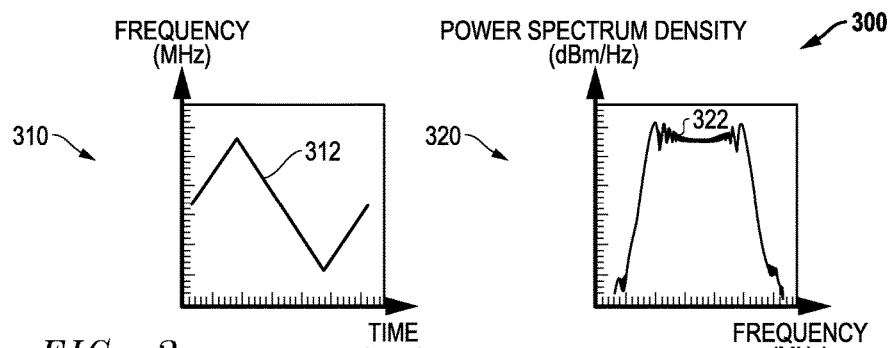
FIG. 3 illustrates a dual timing diagram and frequency graph of the spread spectrum clock generator of FIG. 1 when using a second type of modulation signal.

FIG. 3 illustrates a dual timing diagram and frequency graph 300 of spread spectrum clock generator 100 of FIG. 1 when using a second type of modulation signal. Dual timing diagram and frequency graph 300 includes a timing diagram 310 and a frequency graph 320. In timing diagram 310 the horizontal axis represents time in microseconds (μsec), and the vertical axis represents frequency in MHz. A waveform 312 shows the MODULATION SIGNAL exhibiting a triangular waveform. The triangular waveform could be expected to be a better candidate waveform because it has a uniform amplitude over its cycle instead of the non-uniform amplitude of the sinusoidal waveform.

In frequency graph 320, the horizontal axis represents frequency of the spread spectrum clock signal in MHz, and the vertical axis represents the power spectrum density in dBm/Hz. A waveform 322 shows the power spectrum density of the SPREAD SPECTRUM CLOCK SIGNAL versus frequency. As shown in FIG. 3, the power spectrum density still peaks around the low and high frequencies of the band as in the sinusoidal case of FIG. 3, but the peaking is sufficiently smaller compared to the average in the center of the band. The peaking and the sidebands are caused by the imperfect characteristics of the clock generator when the clock generator is implemented as a PLL. The peaking again limits the effectiveness of triangular wave modulation in reducing EMI.

Figure 4:
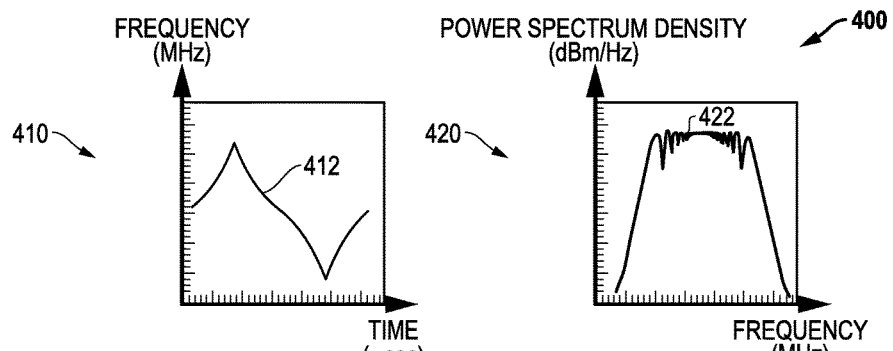
FIG. 4 illustrates a dual timing diagram and frequency graph of the spread spectrum clock generator of FIG. 1 when using a third type of modulation signal.

FIG. 4 illustrates a dual timing diagram and frequency graph 400 of spread spectrum clock generator 100 of FIG. 1 when using a third type of modulation signal. Dual timing diagram and frequency graph 400 includes a timing diagram 410 and a frequency graph 420. In timing diagram 410 the horizontal axis represents time in microseconds (μsec), and the vertical axis represents frequency in MHz. A waveform 412 shows the modulation clock signal exhibiting a modified triangular waveform as disclosed in U.S. Pat. No. 5,488,627. Waveform 412 is in the shape of a triangular wave and its cubic, and has a similar shape to the chocolate candy sold under the trademark "Hershey's Kiss" sold by the Hershey Company of Hershey, Pa. Waveform 412 exhibits characteristics somewhat opposite those of waveform 212 near its high and low voltages.

In frequency graph 420, the horizontal axis represents frequency of the spread spectrum clock signal in MHz, and the vertical axis represents the power spectrum density in dBm/Hz. A waveform 422 shows the power spectrum density of the SPREAD SPECTRUM CLOCK SIGNAL versus frequency. As shown in FIG. 4, the power spectrum density peaks in the middle of the band and shows variable attenuation at the edges of the band. Moreover unlike waveform 322, it does not exhibit peaking at the sidebands. However while waveform 412 demonstrates an improvement over the sinusoidal and triangle waveforms of FIGS. 2 and 3 when used with a PLL, further improvements are desirable.

Figure 5:
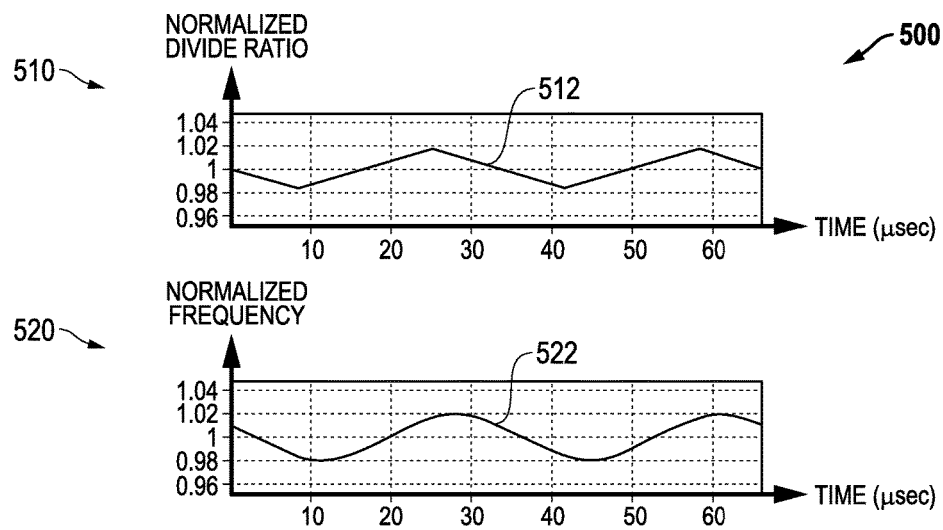
FIG. 5 illustrates a dual timing diagrams showing the use of an ideal triangular waveform to modulate a clock signal and the actual frequency profile in a typical spread spectrum clock generator.

FIG. 5 illustrates a dual timing diagram 500 showing the use of an ideal triangular waveform to modulate a clock signal and the actual frequency profile in a typical spread spectrum clock generator. Dual timing diagram 500 includes timing diagrams 510 and 520. In timing diagram 510, the horizontal axis represents time in microseconds (μsec), and the vertical axis represents the MODULATION SIGNAL as a normalized divide ratio input to a PLL. A waveform 512 represents the normalized divide ratio. As shown in FIG. 5, waveform 512 is a triangular waveform extending from about 0.98 to about 1.02, or a variation of about 4% when used to modulate a REFERENCE CLOCK SIGNAL having a nominal frequency of 27 MHz. A complete sweep of frequencies occurs over about 33 μsec, and the MODULATION SIGNAL has a period of about 30 kHz.

In timing diagram 520, the horizontal axis represents time in μsec, and the vertical axis represents normalized frequency. A waveform 522 shows the normalized frequency of the SPREAD SPECTRUM CLOCK SIGNAL at a given time. As shown in FIG. 5, times near the minimum and maximum normalized frequencies are distorted by being rounded off from the ideal waveform 512. This distortion leads to a less-than ideal SPREAD SPECTRUM CLOCK SIGNAL that significantly decreases the effectiveness of the spread spectrum technique.

Figure 6:
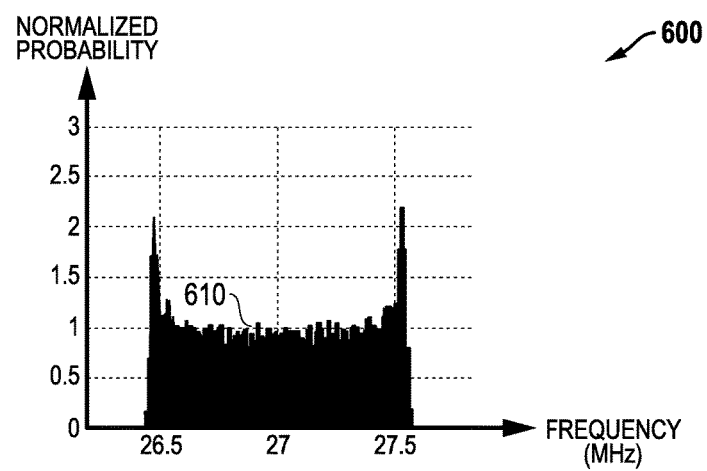
FIG. 6 illustrates a graph showing the normalized probability of a spread spectrum clock generator using the triangular waveform of FIG. 5.

FIG. 6 illustrates a graph 600 showing the normalized probability of a spread spectrum clock generator using the triangular waveform of FIG. 5. In FIG. 6, the horizontal axis represents frequency in MHz, and the vertical axis represents normalized probability of the SPREAD SPECTRUM CLOCK SIGNAL having a nominal frequency of 27 MHz. A waveform 610 represents the normalized probability of the SPREAD SPECTRUM CLOCK SIGNAL when the fundamental frequency is spread from about 26.46 MHz to about 27.54 MHz. Waveform 610 show narrow but significant peaking around the low and high frequencies of this frequency band. The peaks correspond to the distortion at the high and low frequencies in waveform 522 above. Even though the peaks occur in narrow bands, they determine peak EMI levels compliance.

Figure 7:
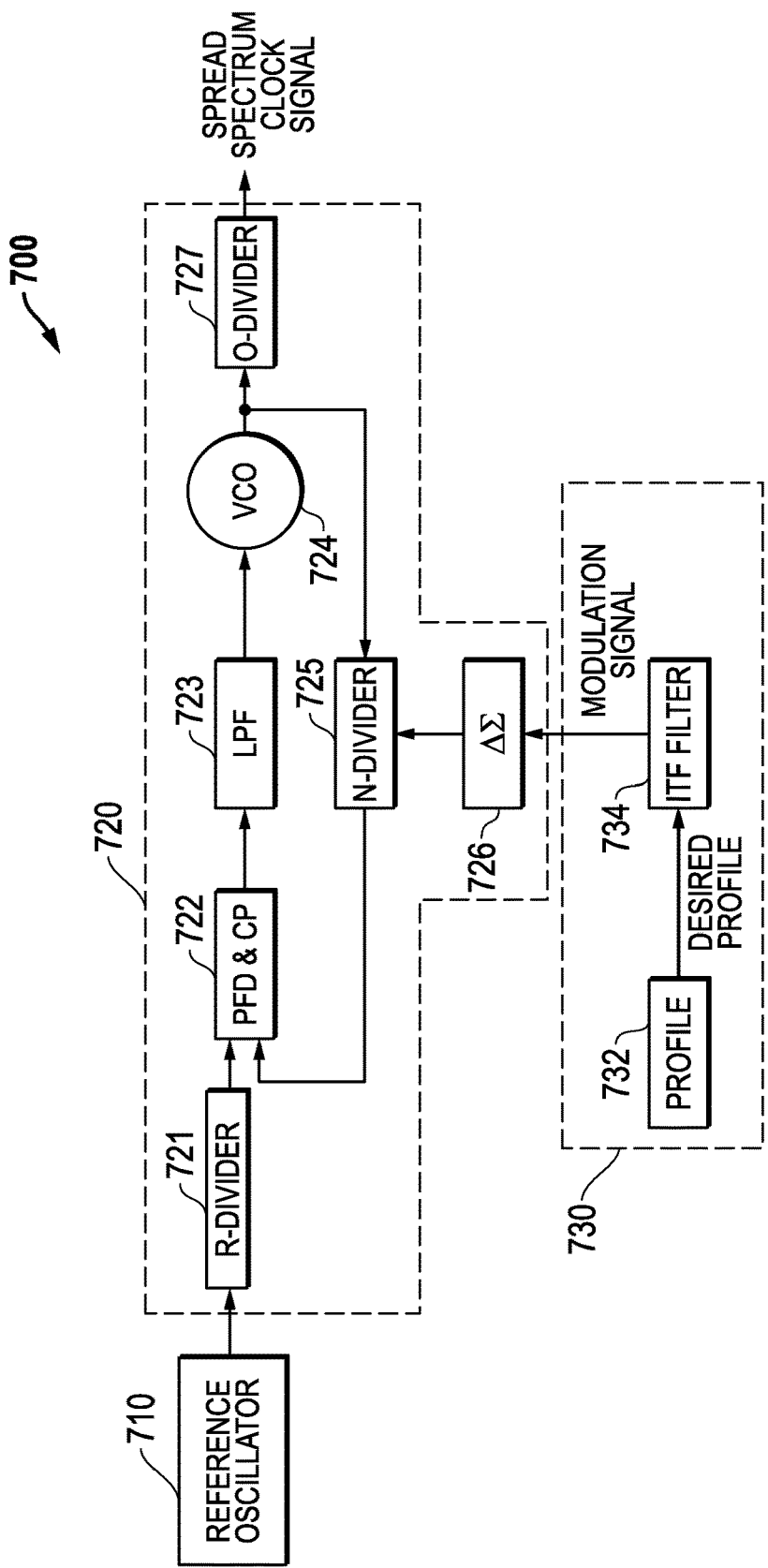
FIG. 7 shows in block diagram form a spread spectrum clock generator according to an embodiment of the present invention.

FIG. 7 shows in block diagram form a spread spectrum clock generator 700 according to an embodiment of the present invention. Spread spectrum clock generator 700 includes a reference oscillator 710, a clock generator 720, and a modulator 730. Reference oscillator 710 has an output for providing the "REFERENCE CLOCK SIGNAL" at a desired nominal frequency (such as 27 MHz).

Clock generator 720 has a first input connected to the output of reference oscillator 110, a second input for receiving the MODULATION SIGNAL, and an output for providing the SPREAD SPECTRUM CLOCK SIGNAL. Clock generator 720 is implemented as a PLL having a reference divider (R-divider) 721, a combined phase/frequency detector and charge pump 722, a low pass filter 723, a voltage controlled oscillator (VCO) 724, a loop divider (N-divider) 725, a delta-sigma (ΔΣ) modulator 726, and an output divider (O-divider) 727. R-divider 721 has an input connected to the output of reference oscillator 710 for receiving the REFERENCE CLOCK SIGNAL, and an output. Phase and frequency detector and charge pump 722 has a first input connected to the output of R-divider 721, a second input, and an output. Low pass filter 723 has an input connected to the output of phase/frequency detector and charge pump 722, and an output. VCO 724 has an input connected to the output of low pass filter 723, and an output. N-divider 725 has an input connected to the output of VCO 726, a control input, and an output connected to the second input of phase/frequency detector and charge pump 722. ΔΣ modulator 726 has an input for receiving the MODULATION SIGNAL, and an output connected to the control input of divider 725. O-divider 727 has an input connected to the output of VCO 724, and an output for providing the SPREAD SPECTRUM CLOCK SIGNAL.

Modulator 730 has an output connected to the second input of clock generator 720 for providing the MODULATION SIGNAL thereto. Modulator 730 includes a profile memory 732 and an inverse transfer function (ITF) filter 734. Profile memory 732 has an input for receiving a sample clock signal, not shown in FIG. 7, and an output for providing a signal labeled "DESIRED PROFILE". ITF filter 734 has an input connected to the output of profile memory 732 for receiving the DESIRED PROFILE, and an output for providing the MODULATION SIGNAL.

In operation, profile memory 732 stores a waveform table for values of a signal that provides a uniform frequency change over a predetermined period of time. For example, profile memory 732 can store values of a triangular waveform such as waveform 512 of FIG. 5. Waveform 512 is a symmetric triangular waveform because over any period the rise and fall times are equal. In another example, profile memory 732 can store a waveform table for values of an asymmetric triangular waveform, in which over any given period the rise and fall times are different. In particular a sawtooth waveform is an asymmetric triangular waveform in which the wave ramps gradually but falls sharply over a cycle. Other waveforms that have uniform amplitudes over their cycles may be sufficient as well. Profile memory 732 is clocked by a clock signal that determines the step size. ITF filter 734 conditions the DESIRED PROFILE based on an inverse of the transfer function of clock generator 720 to provide the MODULATION SIGNAL. For example, the PLL will distort an ideal triangular wave signal based on the low pass characteristic of low pass filter 723. Thus ITF filter 734 adds a corresponding high pass characteristic such that the SPREAD SPECTRUM CLOCK SIGNAL has the desired profile. ITF filter 734 provides the MODULATION SIGNAL as a fractional divide ratio. Thus the transfer function is characterized between the fractional divide ratio and the frequency of the SPREAD SPECTRUM CLOCK SIGNAL. ΔΣ modulator 736 then modulates the fractional divide ratio into a dithered integer divide ratio and provides the dithered integer divide ratio to N-divider 725.

In one implementation, the DESIRED PROFILE is a sequence of digital samples of a triangular waveform, and ITF filter 734 is implemented as a digital finite impulse response (FIR) filter.

Figure 8:
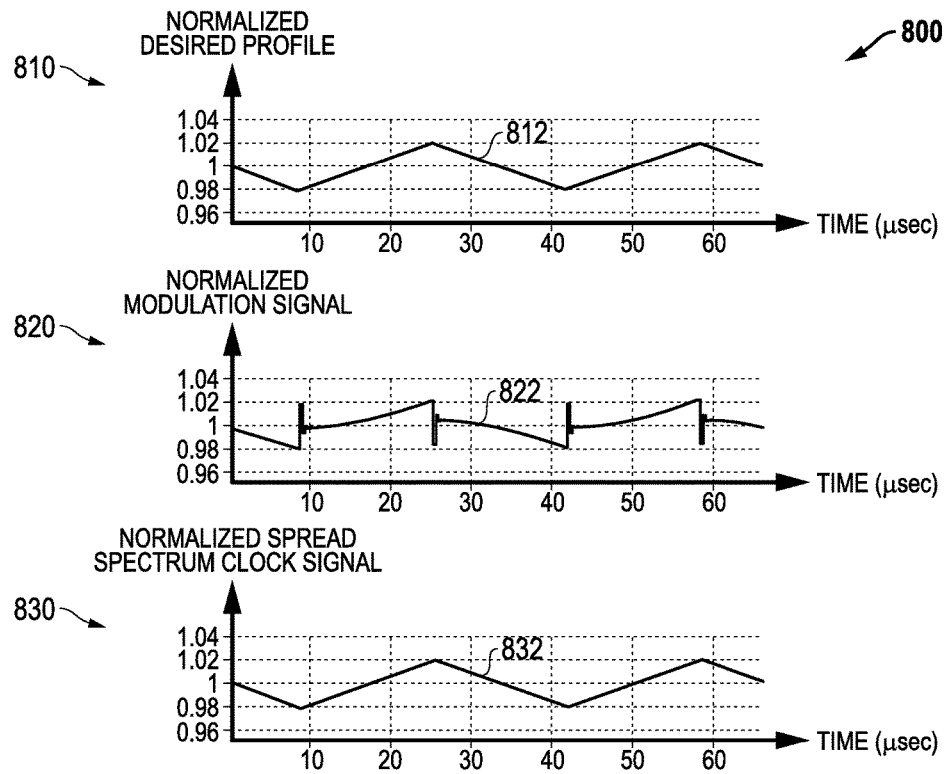
FIG. 8 shows a set of timing diagrams related to the operation of the spread spectrum clock generator of FIG. 7.

FIG. 8 shows a set of timing diagrams 800 related to the operation of spread spectrum clock generator 700 of FIG. 7. Set of timing diagrams 800 includes timing diagrams 810, 820, and 830. In timing diagram 810, the horizontal axis represents time in μsec, and the vertical axis represents the normalized DESIRED PROFILE. A waveform 812 represents the DESIRED PROFILE, which is a triangular waveform varying from about 0.98 to about 1.02, or a variation of about 4%. In this example a complete sweep of frequencies occurs over about 33 μsec.

In timing diagram 820, the horizontal axis represents time in μsec, and the vertical axis represents the normalized MODULATION SIGNAL. A waveform 822 represents the DESIRED PROFILE conditioned by the inverse transfer function of the PLL. Waveform 822 is significantly different than waveform 812 due to the conditioning, especially around the high and low points of the DESIRED PROFILE.

In timing diagram 830, the horizontal axis represents time in μsec, and the vertical axis represents the normalized frequency of the SPREAD SPECTRUM CLOCK SIGNAL. A waveform 832 represents the frequency of the SPREAD SPECTRUM CLOCK SIGNAL. Waveform 832 appears to be identical in shape to waveform 812, maintaining the same sharp changes in slope near the high and low points as the DESIRED PROFILE.

Figure 9:
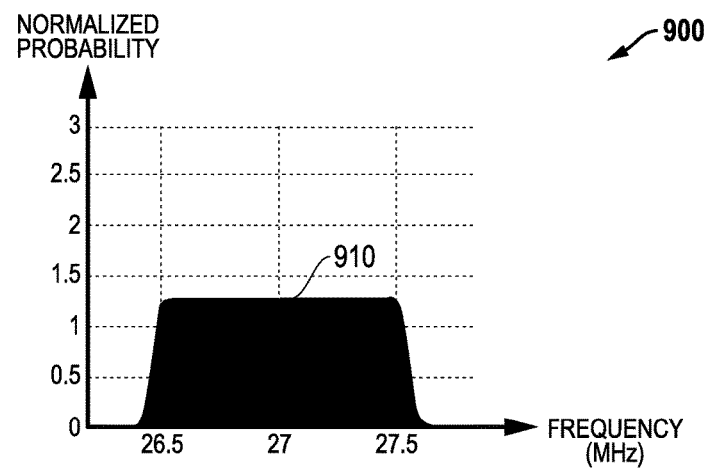
FIG. 9 illustrates a graph showing the normalized frequency probability of the spread spectrum clock signal of FIG. 7.

FIG. 9 illustrates a graph showing the normalized frequency probability of the spread spectrum clock signal of FIG. 7. In FIG. 9, the horizontal axis represents frequency in MHz, and the vertical axis represents normalized probability of the frequency of a SPREAD SPECTRUM CLOCK SIGNAL having a nominal frequency of 27 MHz. A waveform 910 represents the normalized probability of frequency of the SPREAD SPECTRUM CLOCK SIGNAL when the fundamental frequency is spread from about 26.46 MHz to about 27.54 MHz. Waveform 910 shows a nearly perfectly uniform distribution of frequencies from the low to the high frequencies of this frequency band. By smoothing out the frequency profile across the entire band, peak EMI levels are substantially reduced compared to those of FIG. 6. Alternatively, the frequency of the SPREAD SPECTRUM CLOCK SIGNAL does not need to be spread as widely to meet the same EMI specifications.

TABLE I shows the improvement measured in terms of peak reduction of both the fundamental frequency and the fifth harmonic provided by the known profiles described above compared to no modulation:

TABLE I

| TYPE OF MODULATION PROFILE | PEAK REDUCTION AT FUNDAMENTAL | PEAK REDUCTION AT 5$^{th}$ HARMONIC |
| --- | --- | --- |
| Triangular wave | −6.5 dB | −10.3 dB |
| Triangular wave and its cubic | −6.9 dB | −12.7 dB |
| New Profile | −7.0 dB | −14.6 dB |

Implementations of the Spread Spectrum Clock Generator

Figure 10:
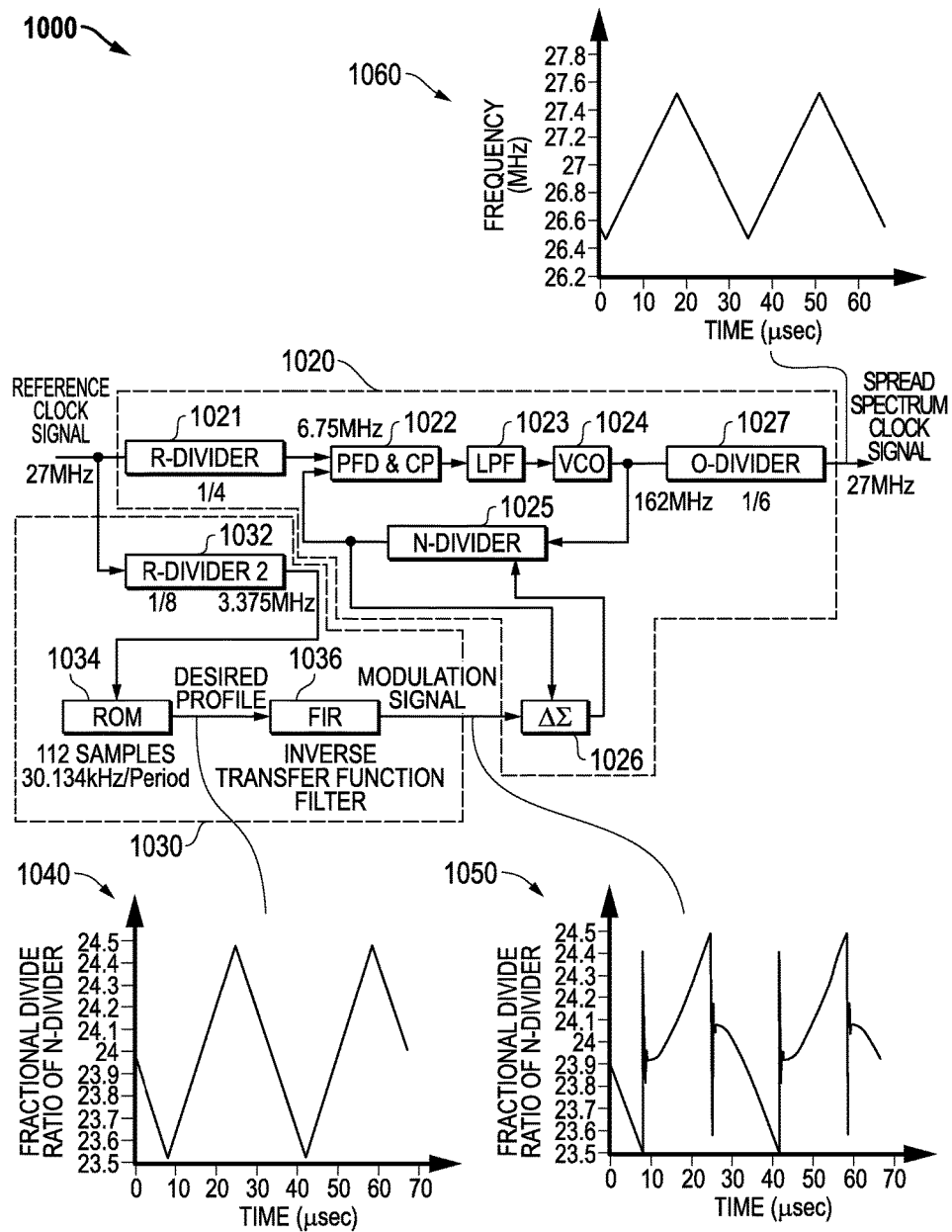
FIG. 10 illustrates in block diagram form a spread spectrum clock generator according to a first particular implementation of the spread spectrum clock generator of FIG. 7, along with associated graphs.

FIG. 10 illustrates in block diagram form a spread spectrum clock generator 1000 according to a first particular implementation of spread spectrum clock generator 700 of FIG. 7, along with associated graphs. Spread spectrum clock generator 1000 includes generally a clock generator 1020 and a modulator 1030.

Clock generator 1020 has a first input for receiving the REFERENCE CLOCK SIGNAL, a second input for receiving the MODULATION SIGNAL, and an output for providing the SPREAD SPECTRUM CLOCK SIGNAL. Clock generator 1020 is implemented as a PLL having an R-divider 1021, a phase and frequency detector and charge pump 1022, a low pass filter 1023, a VCO 1024, an N-divider 1025, and a ΔΣ modulator 1026, and an output divider labeled "O-divider" 1027. R-divider 1021 has an input for receiving the REFERENCE CLOCK SIGNAL, and an output. Phase and frequency detector and charge pump 1022 has a first input connected to the output of R-divider 1021, a second input, and an output. Low pass filter 1023 has an input connected to the output of phase and frequency detector and charge pump 1022, and an output. VCO 1024 has an input connected to the output of lowpass filter 1023, and an output. N-divider 1025 has a first input connected to the output of VCO 1024, a second input, and an output connected to the second input of phase and frequency detector and charge pump 1022. ΔΣ modulator 1026 has an input connected to the output of FIR filter 1036, and an output connected to the second input of N-divider 1025. O-divider 1027 has an input connected to the output of VCO 1024, and an output for providing the SPREAD SPECTRUM CLOCK SIGNAL.

Modulator 1030 has a first input for receiving the REFERENCE CLOCK SIGNAL, a second input connected to the output of N-divider 1025, and an output connected to the second input of clock generator 1020 for providing the MODULATION SIGNAL thereto. Modulator 1030 includes a second reference divider (R-divider 2) 1032, a profile memory 1034 implemented as a read-only memory (ROM), and an ITF filter 1036 implemented as an FIR filter. R-divider 2 1032 has an input for receiving the REFERENCE CLOCK SIGNAL, and an output. Profile memory 1034 has a clock input connected to the output of R-divider 2 1032, and an output for providing the DESIRED PROFILE. Profile memory 1034 stores a waveform table of values of a signal that provides a uniform frequency change over a predetermined period of time. ITF filter 1036 has an input connected to the output of profile memory 1034 for receiving the DESIRED PROFILE, and an output for providing the MODULATION SIGNAL.

In the example shown in FIG. 10, clock generator 1020 is a particular implementation of clock generator 720 of FIG. 7 and modulator 1030 is a particular implementation of modulator 730 of FIG. 7. R-divider 1021 divides the 27 MHz REFERENCE CLOCK SIGNAL by four to provide a 6.75 MHz clock signal to the first input of phase and frequency detector and charge pump 1022. N-divider 1025 divides the output of VCO 1024 by a programmable divide ratio that is nominally 24 (to yield a frequency of the output of VCO 1024 to be about 162 MHz) but that can vary between about 22 and about 26. O-divider 1027 divides the 162 MHz clock signal output by VCO 1024 by six to again yield a SPREAD SPECTRUM CLOCK SIGNAL having a nominal frequency of 27 MHz. A timing diagram 1040 illustrates the DESIRED PROFILE as an ideal triangular waveform in which the horizontal axis represents time in μsec and vertical axis represents the divide ratio. Timing diagram 1040 shows that the fractional divide ratio varies from 23.5 to 24.5 over a period of about 33 μsec. FIR filter 1036 applies the inverse transfer function to the DESIRED PROFILE to produce the MODULATION SIGNAL. A timing diagram 1050 illustrates the MODULATION SIGNAL in which the horizontal axis represents time in μsec and vertical axis represents the fractional divide ratio provided to the first input of ΔΣ modulator 1026 that varies between about 23.5 and 24.5. Clock generator 1020 includes an additional O-divider 1027 that divides the output of VCO 1026 by six to transform the nominal 162 MHz input clock signal into a nominal 27 MHz frequency SPREAD SPECTRUM CLOCK SIGNAL. A timing diagram 1060 illustrates the frequency of the SPREAD SPECTRUM CLOCK SIGNAL in which the horizontal axis represents time in μsec and vertical axis represents the frequency in MHz. Timing diagram 1060 shows a nearly perfect triangular wave signal in which the frequency varies between about 26.5 MHz and 27.5 MHz.

Figure 11:
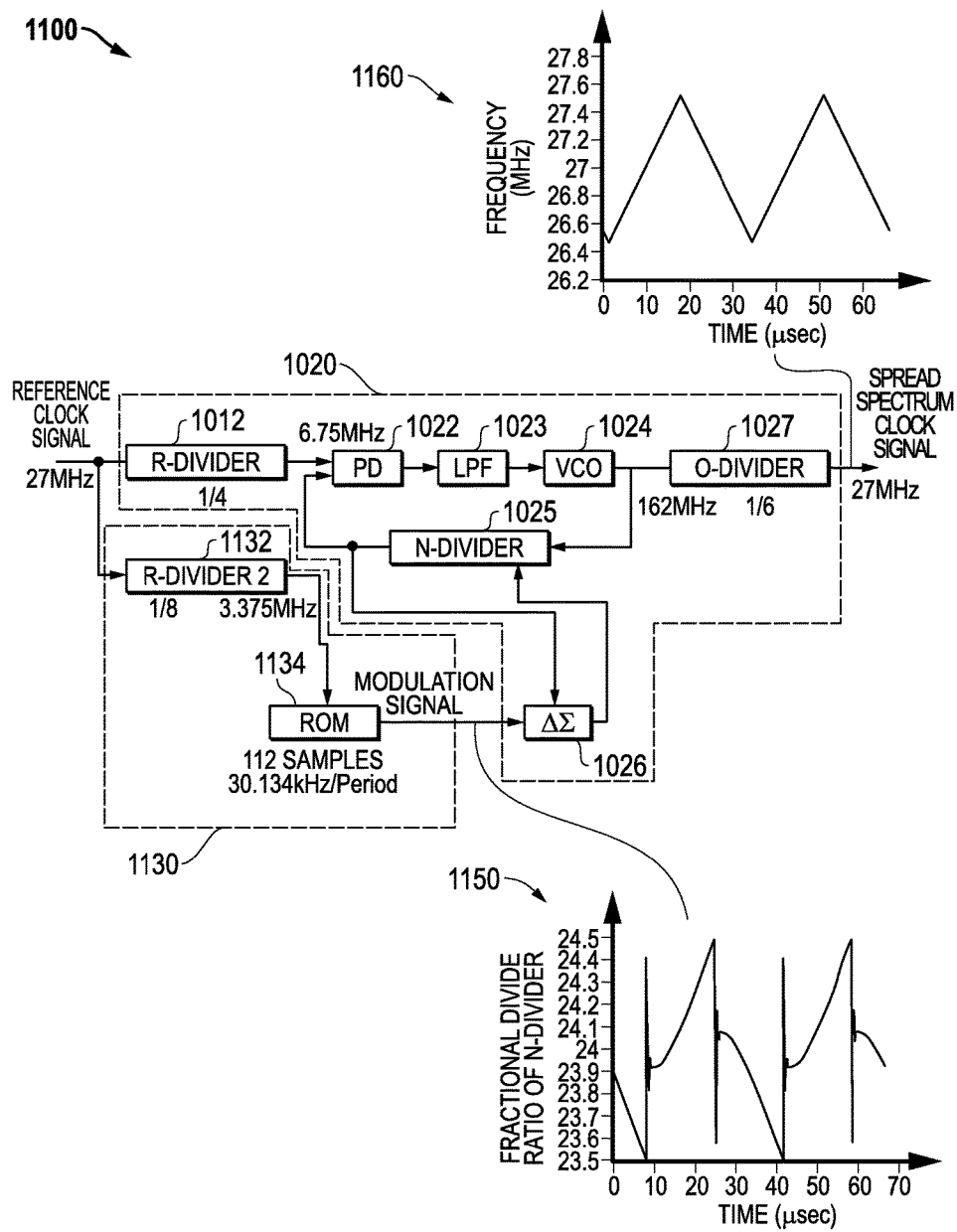
FIG. 11 illustrates in block diagram form a spread spectrum clock generator according to a second particular implementation of the spread spectrum clock generator of FIG. 7, along with associated graphs.

FIG. 11 illustrates in block diagram form a spread spectrum clock generator 1100 according to a second particular implementation of spread spectrum clock generator 700 of FIG. 7, along with associated graphs. Spread spectrum clock generator 1100 includes generally a clock generator 1020 as previously described with respect to FIG. 10 and a modulator 1130.

Modulator 1130 has an input for receiving the REFERENCE CLOCK SIGNAL, and an output connected to the second input of clock generator 1020 for providing the MODULATION SIGNAL thereto. Modulator 1130 includes an R-divider 2 1132 and a profile memory implemented as a ROM 1134. R-divider 2 1132 has an input for receiving the REFERENCE CLOCK SIGNAL, and an output. ROM 1132 has a clock input connected to the output of R-divider 2 1032, and an output for providing the MODULATION SIGNAL. ROM 1132 stores a waveform table of values of a signal that provides a uniform frequency change over a predetermined period of time. However unlike ROM 1032 of FIG. 10, ROM 1132 does not store the DESIRED PROFILE, but rather a desired profile that has been pre-distorted by the inverse transfer function of clock generator 1020. By storing pre-distorted values in ROM 1134, spread spectrum clock generator 1100 saves area and power compared to spread spectrum clock generator 1000 of FIG. 10. Spread spectrum clock generator 1100 is suitable for applications in which the clock signal will be generated at a known, stable frequency.

Spread Spectrum Clock Generator with Calibration

However spread spectrum clock generator 1100 is not very suitable for use with a clock signal that may vary over a range of frequencies since the transfer function and hence the inverse transfer function of clock generator 1020 will vary with frequency. A technique to accommodate varying clock frequencies will now be described.

Figure 12:
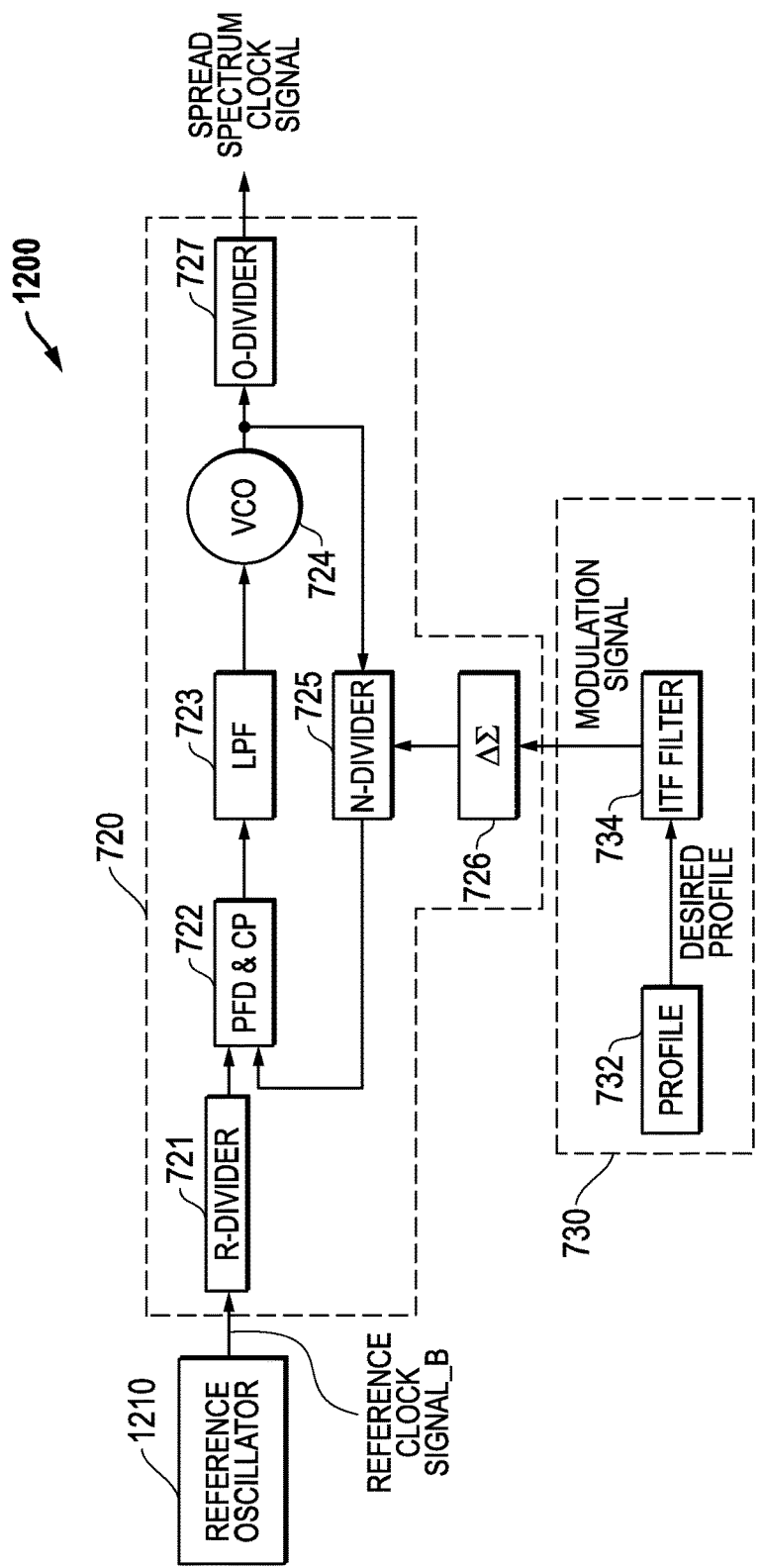
FIG. 12 illustrates in block diagram form a spread spectrum clock generator using a reference oscillator that produces a different reference clock signal than the reference oscillator of FIG. 7.

FIG. 12 illustrates in block diagram form a spread spectrum clock generator 1200 using a reference oscillator 1210 that produces a different reference clock signal labeled "REFERENCE CLOCK SIGNAL_B" than reference oscillator 710 of FIG. 7. As will be shown in more detail below, when REFERENCE CLOCK SIGNAL_B has a frequency that is significantly different than the nominal frequency, the coefficients of ITF filter 734 are no longer are capable of accurately compensating for the transfer function of clock generator 720. The example that will be described will be a REFERENCE CLOCK SIGNAL_B of 37 MHz.

Figure 13:
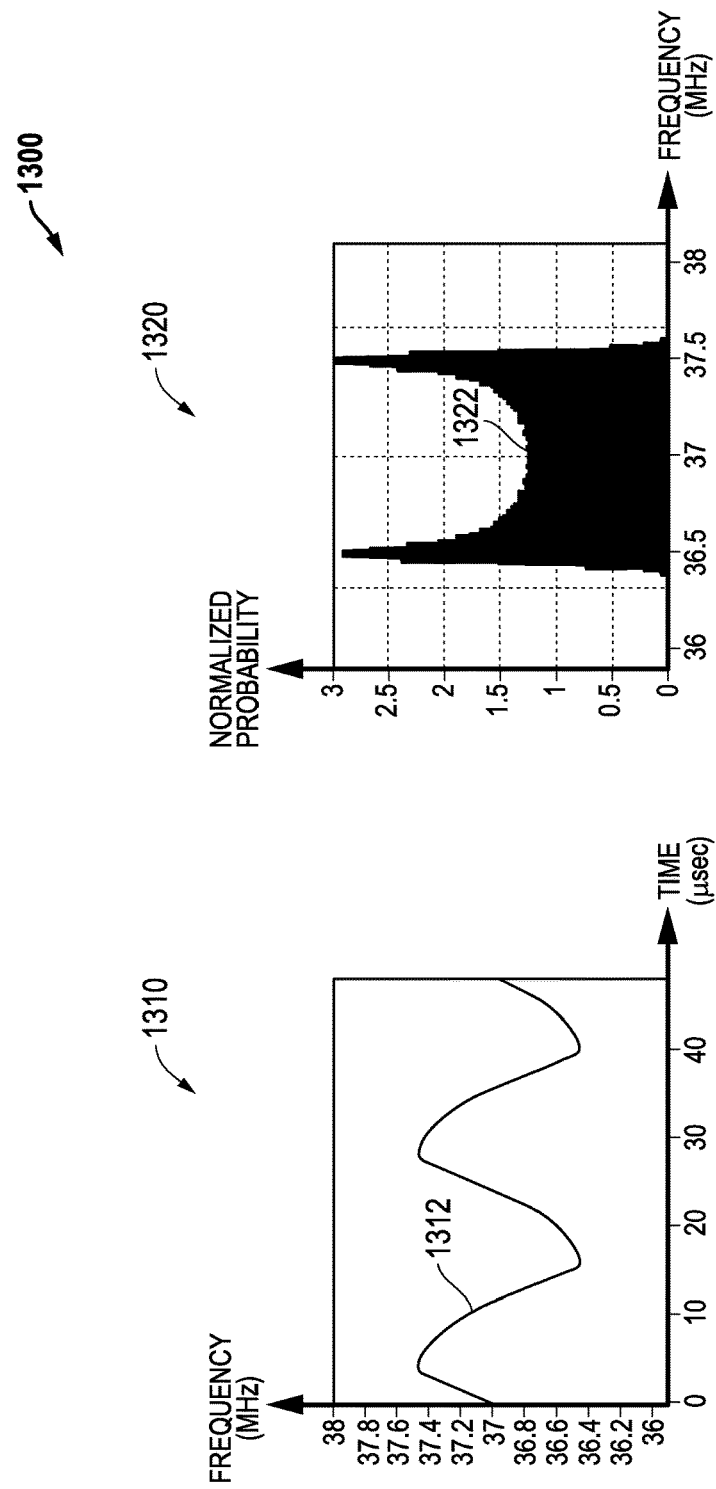
FIG. 13 illustrates a dual timing diagram and frequency graph of the spread spectrum clock generator of FIG. 12 when the reference clock signal has a different frequency than the nominal clock signal.

FIG. 13 illustrates a dual timing diagram and frequency graph of spread spectrum clock generator 1200 of FIG. 12 when the reference clock signal has a different frequency than the nominal clock signal. Shown in FIG. 13 are a timing diagram 1310 and a frequency graph 1320. In timing diagram 1310 the horizontal axis represents time in microseconds (μsec), and the vertical axis represents frequency in megahertz (MHz). A waveform 1312 shows the frequency of the SPREAD SPECTRUM CLOCK SIGNAL having a profile that is distorted from the ideal triangular shape of the waveform shown in timing diagram 1060 of FIG. 10 due to the divergence between the 27 MHz nominal frequency of the REFERENCE CLOCK SIGNAL and the actual frequency of 37 MHz of reference oscillator 1210.

In frequency graph 1320, the horizontal axis represents frequency in MHz, and the vertical axis represents normalized probability of the frequency of the SPREAD SPECTRUM CLOCK SIGNAL having a nominal frequency of 37 MHz. A waveform 1322 represents the normalized probability of the frequency of the SPREAD SPECTRUM CLOCK SIGNAL when the fundamental frequency is spread from about 36.5 MHz to about 37.5 MHz. Waveform 1322 shows peaking around the low and high frequencies of this frequency band that is even more pronounced than the peaking shown in waveform 610 of FIG. 6. For example the normalized probability around the high and low peaks is close to 3, and the SPREAD SPECTRUM CLOCK SIGNAL does not spread the energy evenly over the modulation band.

In order to compensate for frequency changes in systems in which the REFERENCE CLOCK FREQUENCY may vary, the inventor has discovered that the spread spectrum clock generator can be modified to include a calibration of FIR filter coefficients for the particular REFERENCE CLOCK FREQUENCY that is being used. In this way, such a spread spectrum clock generator preserves the excellent frequency response of spread spectrum clock generator 700 over a range of frequencies.

Figure 14:
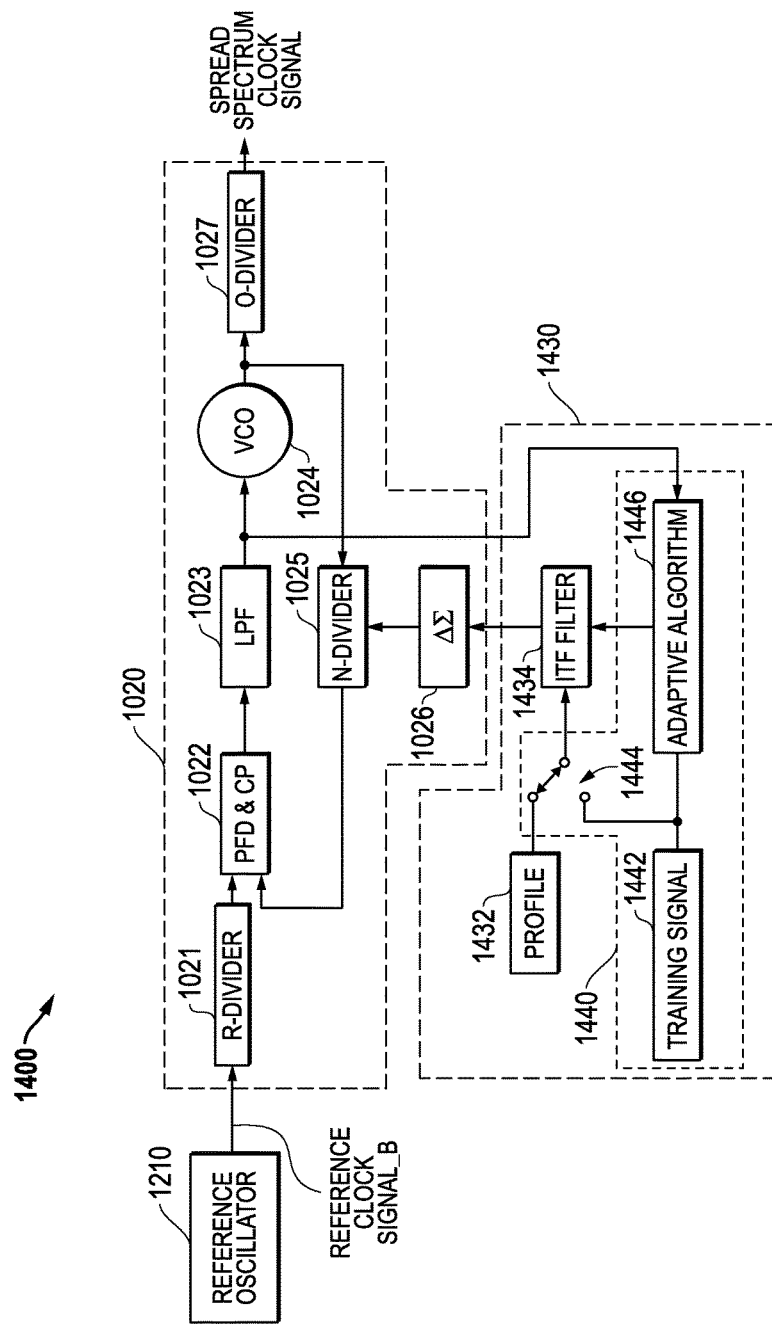
FIG. 14 illustrates in block diagram form a spread spectrum clock generator with calibration according to another embodiment of the present invention.

FIG. 14 illustrates in block diagram form a spread spectrum clock generator 1400 with calibration according to another embodiment of the present invention. Spread spectrum clock generator 1400 includes reference oscillator 1210 and clock generator 1020 as previously discussed with respect to FIGS. 10 and 12. However spread spectrum clock generator 1400 includes a modulator 1430 with a calibration capability. Modulator 1430 includes generally a profile memory 1432, an ITF filter 1434, and a calibration circuit 1440. Profile memory 1432 has an input for receiving a sample clock signal, not shown in FIG. 14, and an output for providing the DESIRED PROFILE. ITF filter 1434 has a signal input, a coefficient input, and an output for providing the MODULATION SIGNAL. Calibration circuit 1440 includes a training signal generator 1442, a switch 1444, and an adaptive algorithm 1446. Training signal generator 1442 has an output for providing a training signal during a calibration mode. Switch 1444 is a single-pole, double throw (SPDT) switch having a first switch terminal connected to the output of profile memory 1432, a second switch terminal connected to the output of training signal generator 1442, and a common terminal connected to the input of ITF filter 1434, and a control terminal for receiving a mode signal (not shown in FIG. 14). Adaptive algorithm 1446 has a first input connected to the output of low pass filter 1023 in clock generator 1020, a second input connected to the output of training signal generator 1442, and a coefficient output connected to the coefficient input of ITF filter 1434.

Switch 1444 is responsive to the mode signal indicating a calibration mode to connect the second switch terminal to the common terminal thereof. Training signal generator 1442 provides a calibration training signal sequence to the signal input of ITF filter 1434. Adaptive algorithm 1446 compares the training signal to the output of lowpass filter 1023 and adjusts the coefficients according to the difference between them. Adaptive algorithm 1446 may use any known algorithm for adaptively changing FIR filter coefficients, such as a least mean squares (LMS) adaptation. By the end of the training period, the trained coefficients cause ITF filter 1434 to accurately reflect the inverse transfer function of clock generator 1020 when operated at a frequency corresponding to REFERENCE CLOCK SIGNAL_B.

After the calibration period, modulator 1430 enters a normal operation mode. Switch 1444 is responsive to the mode signal indicating the normal operation mode to connect the second switch terminal to the common terminal thereof, and modulator 1430 operates similarly to modulator 730 but with coefficients trained for operation at the frequency corresponding to REFERENCE CLOCK SIGNAL_B.

Figure 15:
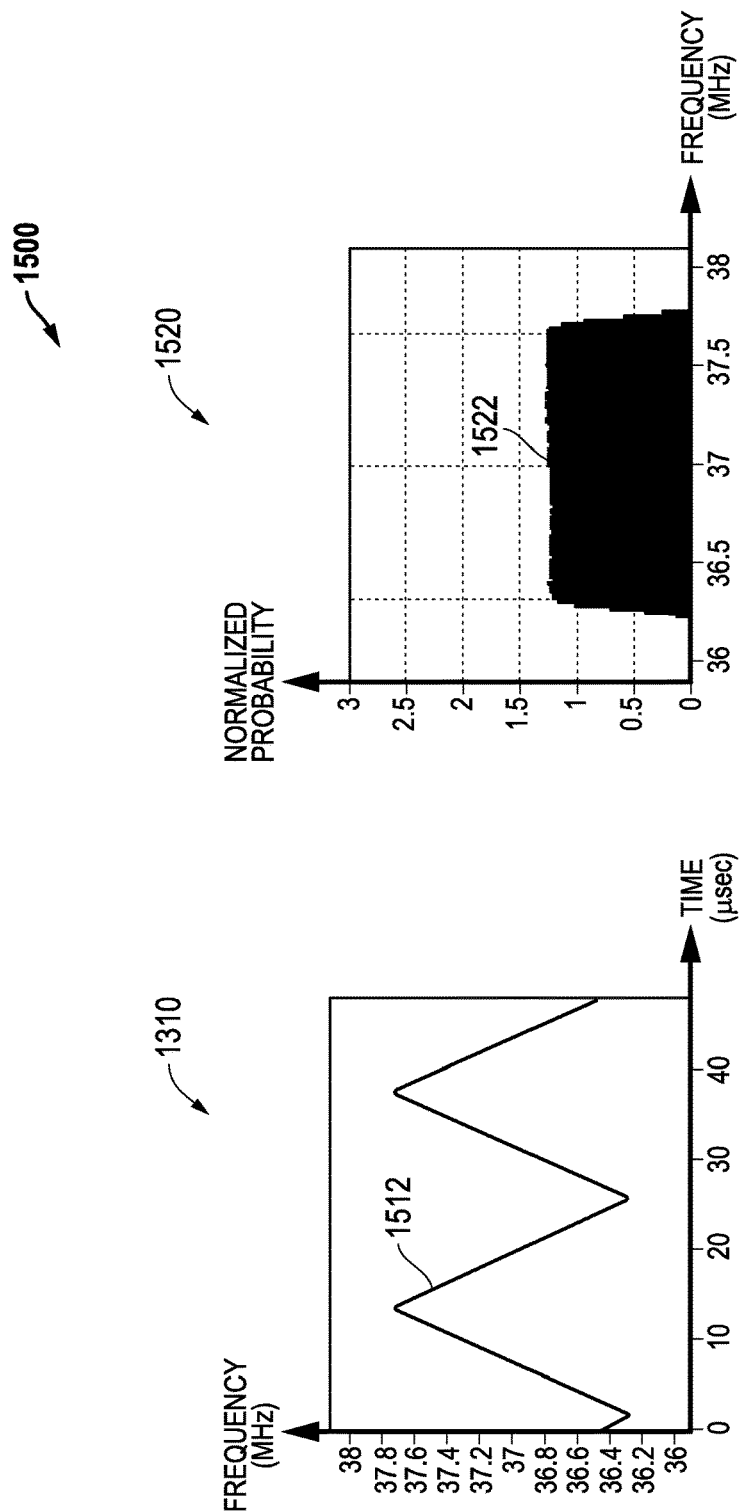
FIG. 15 shows a dual timing diagram and frequency graph of the spread spectrum clock generator of FIG. 14.

FIG. 15 shows a dual timing diagram and frequency graph of spread spectrum clock generator 1400 of FIG. 14. Shown in FIG. 15 are a timing diagram 1510 and a frequency graph 1520. In timing diagram 1510 the horizontal axis represents time in microseconds (μsec), and the vertical axis represents frequency in megahertz (MHz). A waveform 1512 shows the SPREAD SPECTRUM CLOCK SIGNAL having a frequency profile that is substantially the same ideal triangular shape of the waveform shown in timing diagram 1060 of FIG. 10 except that REFERENCE CLOCK SIGNAL_B has a nominal frequency of 37 MHz instead of 27 MHz.

In frequency graph 1520, the horizontal axis represents frequency in MHz, and the vertical axis represents normalized probability of the frequency of the SPREAD SPECTRUM CLOCK SIGNAL having a nominal frequency of 37 MHz. A waveform 1522 represents the normalized probability of the frequency of the SPREAD SPECTRUM CLOCK SIGNAL when the nominal frequency is spread from about 36.3 MHz to about 37.7 MHz. Waveform 1522 shows a highly uniform distribution of frequencies from the low to the high frequencies of this frequency band. By calibrating the coefficients of the ITF filter for the actual frequency of REFERENCE CLOCK SIGNAL_B, spread spectrum clock generator 1400 again achieves about the same results in peak reduction as spread spectrum clock generator 700 of FIG. 7.

TABLE II shows the improvement measured in terms of peak reduction of both the fundamental and the fifth harmonic provided by the triangle wave conditioned by the inverse transfer function with coefficients set before calibration for a nominal frequency of 27 MHz, and after calibration at the actual frequency of 37 MHz:

TABLE II

| TYPE OF MODULATION PROFILE | PEAK REDUCTION AT FUNDAMENTAL | PEAK REDUCTION AT 5$^{th}$ HARMONIC |
|---|---|---|
| Profile before Calibration | −6.8 dB | −12.6 dB |
| Profile after Calibration | −7.1 dB | −14.8 dB |

Figure 16:
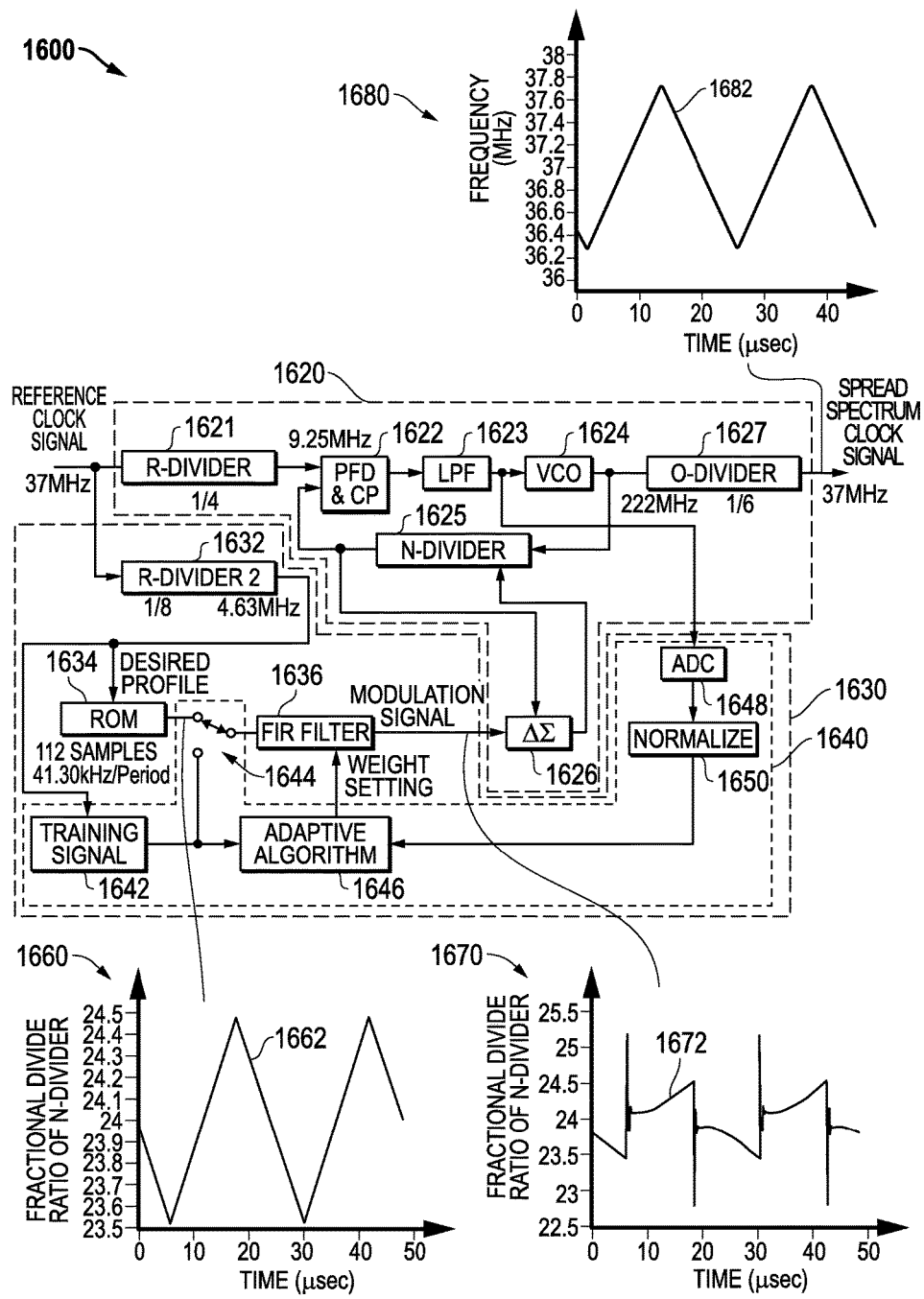
FIG. 16 illustrates in block diagram form a particular implementation of the spread spectrum clock generator of FIG. 14 along with associated graphs.

FIG. 16 illustrates in block diagram form a particular implementation of the spread spectrum clock generator 1400 of FIG. 14 along with associated graphs. Spread spectrum clock generator 1600 includes generally a clock generator 1620 and a modulator 1630.

Clock generator 1620 has a first input for receiving REFERENCE CLOCK SIGNAL_B, a second input for receiving the MODULATION SIGNAL, and an output for providing the SPREAD SPECTRUM CLOCK SIGNAL. Clock generator 1620 is implemented using a PLL having an R-divider 1621, a phase and frequency detector and charge pump 1622, a low pass filter 1623, a VCO 1624, an N-divider 1625, a ΔΣ modulator 1626, and an O-divider 1627. R divider 1621 has an input for receiving REFERENCE CLOCK SIGNAL_B, and an output. Phase and frequency detector and charge pump 1622 has a first input connected to the output of R-divider 1621, a second input, and an output. Low pass filter 1623 has an input connected to the output of phase and frequency detector and charge pump 1622, and an output. VCO 1624 has an input connected to the output of lowpass filter 1623, and an output. N-divider 1625 has an input connected to the output of VCO 1624, and an output connected to the second input of phase and frequency detector and charge pump 1622. O-divider 1627 has an input connected to the output of VCO 1624, and an output for providing the SPREAD SPECTRUM CLOCK SIGNAL.

Modulator 1630 has a first input for receiving REFERENCE CLOCK SIGNAL_B, a second input connected to the output of N-divider 1625, a third input connected to the output of low pass filter 1623, and an output connected to the second input of clock generator 1620 for providing the MODULATION SIGNAL thereto. Modulator 1630 includes an R-divider 2 1632, a profile memory 1634 implemented as a ROM, an ITF filter 1636 implemented as an FIR filter, and a calibration circuit 1640. R-divider 2 1632 has an input for receiving REFERENCE CLOCK SIGNAL_B, and an output. ROM 1634 has a clock input connected to the output of R-divider 2 1632, and an output for providing the DESIRED PROFILE. Profile memory 1634 stores a waveform table of values of a signal that provides a uniform frequency change over a predetermined period of time. ITF filter 1636 has an input for receiving the DESIRED PROFILE, and an output for providing the MODULATION SIGNAL.

Calibration circuit 1640 includes a training signal generator 1642, a switch 1644, an adaptive algorithm 1446, and analog-to-digital converter (ADC) 1648, and a normalize block 1650. Training signal generator 1642 has an input connected to the output of R-divider 2 1632, an output for providing a training signal during a calibration mode. Switch 1644 is a single-pole, double throw (SPDT) switch having a first switch terminal connected to the output of profile memory 1634, a second switch terminal connected to the output of training signal generator 1642, a common terminal connected to the input of ITF filter 1636, and a control terminal for receiving a mode signal (not shown in FIG. 16). Adaptive algorithm coefficient generator 1646 has a first input, a second input connected to the output of training signal generator 1442, and a coefficient output connected to the coefficient input of ITF filter 1434. ADC 1648 has an input connected to the output of low pass filter 1623 in clock generator 1620, and an output. Normalize block 1650 has an input connected to the output of ADC 1648, and an output connected to the first input of adaptive algorithm coefficient generator 1646.

In the example shown in FIG. 16, clock generator 1620 is a particular implementation of clock generator 1020 of FIG. 10 and modulator 1630 is a particular implementation of modulator 1430 of FIG. 14. R-divider 1621 divides the 37 MHz REFERENCE CLOCK SIGNAL_B by four to provide a 9.25 MHz clock signal to the first input of phase and frequency detector and charge pump 1622. N-divider 1625 divides the output of VCO 1024 by a programmable divide ratio that is nominally 24 (to yield a frequency of the output of VCO 1624 of about 222 MHz) but that can vary between about 23.6 and about 24.4. O-divider 1027 divides the 222 MHz clock signal output by VCO 1624 by six to yield a SPREAD SPECTRUM CLOCK SIGNAL having a nominal frequency of 37 MHz. A timing diagram 1660 illustrates the DESIRED PROFILE in which the vertical axis represents time in μsec and vertical axis represents the divide ratio of N-divider 1625. Timing diagram 1660 shows that the DESIRED PROFILE is a triangular waveform and the divide ratio of N-divider 1625 varies from 23.6 to 24.4 over a period of about 34 μsec. FIR filter 1634 applies the inverse transfer function to the DESIRED PROFILE to produce the MODULATION SIGNAL. A timing diagram 1670 illustrates the MODULATION SIGNAL in which the horizontal axis represents time in μsec and vertical axis represents the divide ratio of N-divider 1625. Clock generator 1620 includes an additional O-divider 1627 that divides the output of VCO 1626 by six to transform the nominal 222 MHz input clock signal into a nominal 37 MHz frequency SPREAD SPECTRUM CLOCK SIGNAL. A timing diagram 1680 illustrates the frequency of the SPREAD SPECTRUM CLOCK SIGNAL in which the horizontal axis represents time in μsec and vertical axis represents the frequency in MHz. Timing diagram 1660 shows a nearly perfect triangular wave signal in which the frequency varies between about 36.3 MHz and 37.7 MHz.

Thus a spread spectrum clock generator is able to generate a SPREAD SPECTRUM CLOCK SIGNAL with significantly reduced peaking in actual circuit implementations, such as circuits using a PLL as the clock generator. The spread spectrum clock generator uses a modulator that conditions a desired profile of the clock signal by an inverse transfer function of the PLL and thereby is able to provide the SPREAD SPECTRUM CLOCK SIGNAL with a near-ideal frequency profile with significantly reduced peaking. In this way the spread spectrum clock generator is able to meet strict EMI standards efficiently.

In some particular embodiments, the spread spectrum clock generator also implements a calibration function. The calibration function allows the inverse transfer function filter to be tuned to the actual frequency used in the PLL. The actual frequency may vary, for example, because the crystal used has a wide tolerance, or because the product allows the user to choose a frequency of operation within a range of frequencies.

The above-disclosed subject matter is to be considered illustrative, and not restrictive, and the appended claims are intended to cover all such modifications, enhancements, and other embodiments that fall within the true scope of the claims. For example the spread spectrum clock generator can be used in a variety of electronic products such as microcontrollers, switch mode power supplies, and the like. Moreover the triangular wave signal could be replaced with a similar signal having a uniform amplitude over a period, such as an asymmetric triangular wave or a sawtooth wave.

Thus, to the maximum extent allowed by law, the scope of the present invention is to be determined by the broadest permissible interpretation of the following claims and their equivalents, and shall not be restricted or limited by the foregoing detailed description.

What is claimed is:

1. A spread spectrum clock signal generator comprising:
   a clock generator for modulating a frequency of a reference clock signal using a modulation signal to provide a spread spectrum clock signal, said clock generator having a characteristic transfer function that varies with values of a frequency of said reference clock signal and a nominal frequency of said reference clock signal can vary over a range of frequencies; and
   a modulator for generating said modulation signal according to a desired profile conditioned by an inverse of said characteristic transfer function of said clock generator at a current nominal value of said frequency of said reference clock signal, wherein said modulator comprises an inverse transfer function filter and said modulator changes coefficients of said inverse transfer function filter according to said current nominal value of said frequency of said reference clock signal.

2. The spread spectrum clock signal generator of claim 1 wherein said modulator comprises:
   a calibration circuit for determining said coefficients of said inverse transfer function filter at said current nominal value of said frequency of said reference clock signal during a calibration mode.

3. The spread spectrum clock signal generator of claim 2 wherein said modulator comprises:
   a profile memory having an output for providing a sequence of signals representative of said desired profile; and
   wherein said inverse transfer function filter has an input coupled to said output of said profile memory in a normal operation mode, and an output for providing said modulation signal.

4. The spread spectrum clock signal generator of claim 3 wherein said calibration circuit comprises:
   a training signal generator for generating a training signal and providing said training signal to said input of said inverse transfer function filter during said calibration mode; and
   an adaptive algorithm coefficient generator having a first input coupled to a second output of said clock generator, a second input coupled to said output of said training signal generator, and an output coupled to said inverse transfer function filter.

5. The spread spectrum clock signal generator of claim 4 wherein said adaptive algorithm coefficient generator iteratively provides said coefficients to said inverse transfer function filter to reduce an error between said training signal and a signal at said second output of said clock generator.

6. The spread spectrum clock signal generator of claim 4 further comprising a switch for switching said input of said inverse transfer function filter between said output of said profile memory in said normal operation mode and said output of said training signal generator in said calibration mode.

7. The spread spectrum clock signal generator of claim 4 wherein:
   said training signal generator provides said training signal at a frequency corresponding to said frequency of said reference clock signal.

8. A spread spectrum clock signal generator comprising:
   a clock generator comprising:
      a reference divider having an input for receiving a reference clock signal, and an output;
      a phase/frequency detector and charge pump having a first input coupled to said output of said reference divider, a second input for receiving a feedback signal, and an output;
      a lowpass filter having an input coupled to said output of said phase/frequency detector and charge pump, and an output;
      a voltage controlled oscillator having an input coupled to said output of said lowpass filter, and an output for providing said spread spectrum clock signal;
      a loop divider having a first input coupled to said output of said voltage controlled oscillator, a second input, and an output coupled to said second input of said phase/frequency detector and charge pump; and
      a delta-sigma modulator having an input for receiving a modulation signal, and an output coupled to said second input of said loop divider,
   a modulator for generating said modulation signal according to a desired profile conditioned by an inverse of a characteristic transfer function of said clock generator at a nominal frequency of said reference clock signal and providing said modulation signal to said input of said delta-sigma modulator, wherein said nominal frequency of said reference clock signal can vary over a range of frequencies, and wherein said modulator comprises an inverse transfer function filter and said modulator changes coefficients of said inverse transfer function filter according to a current nominal frequency of said reference clock signal.

9. The spread spectrum clock signal generator of claim 8 wherein said modulator comprises:
   a calibration circuit for determining said coefficients of said inverse transfer function filter at said current nominal frequency of said reference clock signal.

10. The spread spectrum clock signal generator of claim 9 wherein said modulator comprises:
    a profile memory having an output for providing a sequence of signals representative of said desired profile; and
    wherein said inverse transfer function filter has an input coupled to said output of said profile memory in a normal operation mode, and an output for providing said modulation signal.

11. The spread spectrum clock signal generator of claim 10 wherein said calibration circuit comprises:
    a training signal generator for generating a training signal and providing said training signal to said input of said inverse transfer function filter during a calibration mode; and
    an adaptive algorithm coefficient generator having a first input coupled to a second output of said clock generator, a second input coupled to said output of said training signal generator, and an output coupled to said inverse transfer function filter.

12. The spread spectrum clock signal generator of claim 11 wherein said adaptive algorithm coefficient generator iteratively provides said coefficients to said inverse transfer function filter to reduce an error between said training signal and a signal at said second output of said clock generator.

13. The spread spectrum clock signal generator of claim 12 further comprising a switch for switching said input of said inverse transfer function filter between said output of said profile memory in said normal operation mode and said output of said training signal generator in said calibration mode.

14. The spread spectrum clock signal generator of claim 8 wherein said clock generator further comprises a reference oscillator having an output for providing said reference clock signal wherein said reference clock signal is characterized as being a square wave signal.

15. A method comprising:

modulating a reference clock signal using a modulation clock signal to provide a spread spectrum clock signal, said modulating having a characteristic transfer function that varies with values of a nominal value of said reference clock signal over a desired range;

generating said modulation signal according to a desired profile conditioned by an inverse of said characteristic transfer function of said modulating at a current nominal value of said reference clock signal; and changing said generating using coefficients that vary according to said current nominal value of said reference clock signal.

16. The method of claim 15 wherein said generating comprises:

measuring said inverse of said characteristic transfer function of said modulating at said current nominal value of said reference clock signal during a calibration mode.

17. The method of claim 15 wherein said modulating comprises modulating using a phase locked loop.

18. The method of claim 17 wherein said modulating further comprises varying a value of a loop divide ratio of said phase locked loop.

19. The method of claim 15 wherein said generating said modulation signal according to said desired profile comprises generating said modulation signal according to a triangular wave profile.

20. The method of claim 15 wherein said generating said modulation signal according to said desired profile comprises generating said modulation signal according to an asymmetric triangular wave profile.

* * * * *